Jan. 27, 1970            J. KELLY            3,491,679

CONVEYOR COOKER

Filed July 2, 1968            2 Sheets-Sheet 1

JEFF KELLY
INVENTOR.

BY *Herbert J. Brown*

ATTORNEY

Jan. 27, 1970
J. KELLY
3,491,679
CONVEYOR COOKER
Filed July 2, 1968
2 Sheets-Sheet 2
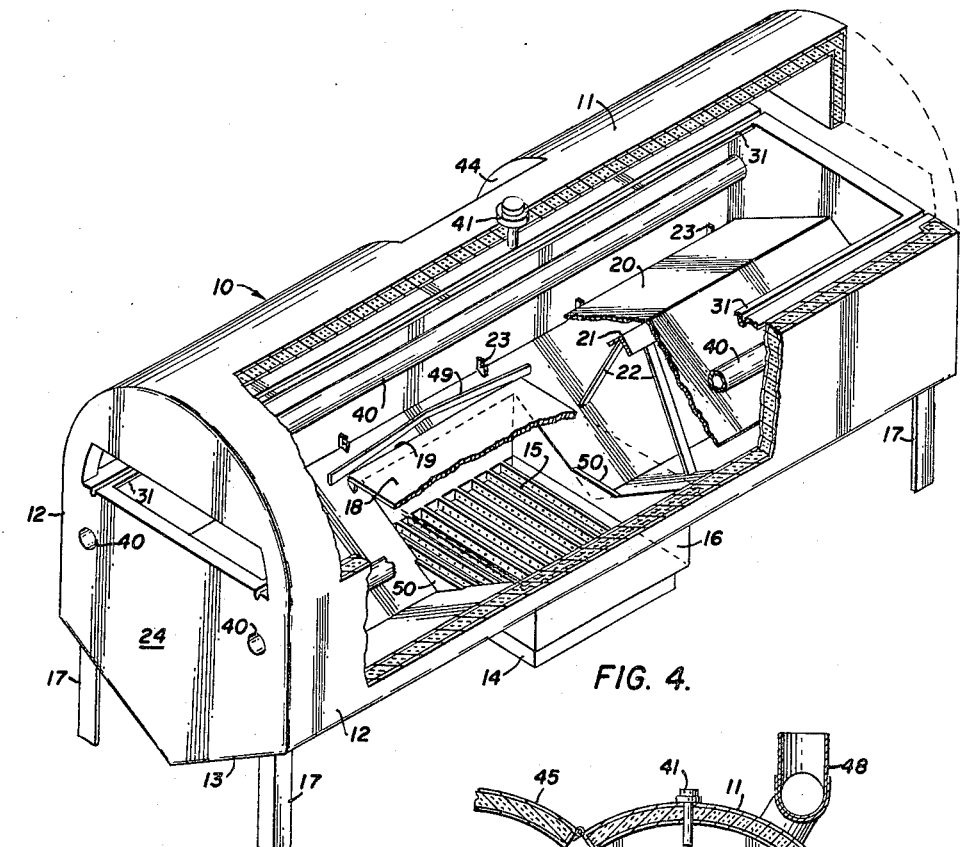
FIG. 4.
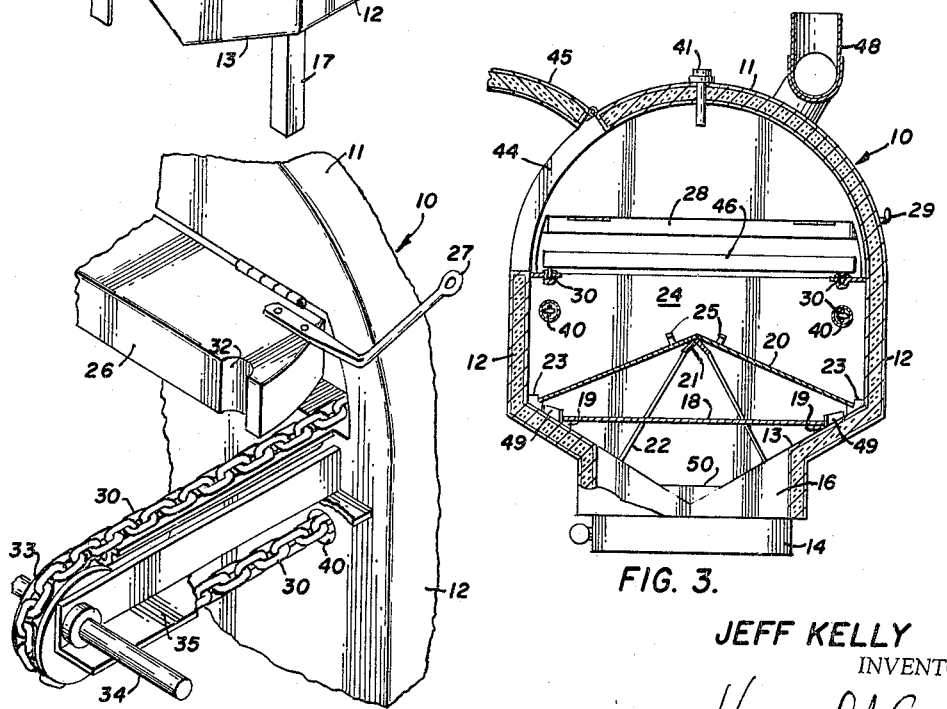
FIG. 6.
FIG. 3.
JEFF KELLY
INVENTOR.
BY Herbert J. Brown
ATTORNEY

United States Patent Office 3,491,679
Patented Jan. 27, 1970

3,491,679
CONVEYOR COOKER
Jeff Kelly, 2222 Edison Drive,
San Antonio, Tex. 78201
Filed July 2, 1968, Ser. No. 741,926
Int. Cl. A23b 1/04
U.S. Cl. 99—331                        4 Claims

ABSTRACT OF THE DISCLOSURE

An insulated continuous conveyor cooker with conductive baffles providing even distribution of heat and means whereby food orders may receive more or less thorough cooking according to the distance they travel on the conveyor.

---

This invention relats to conveyor cookers of the type wherein food is placed on trays on a conveyor and run through an area of controlled heat at a speed to complete the cooking of the food by the end of the run.

An object of the invention is to provide a cooker wherein the heat is evenly distributed throughout the cooking area although supplied by a single burner.

Another object of the invention is to provide a cooker wherein the interior temperature is thermostatically controlled and wherein the cooking time may be varied by an adjustable speed drive for the conveyor.

Another object is to provide a cooker in which different kinds of foods requiring longer or shorter cooking time may be cooked simultaneously.

Another object of the invention is to provide a conveyor cooker into which smoke flavoring, as for barbecue, may be introduced.

Still another object of the invention is to provide a continuous cooker from which fumes can be drawn to the outside and which contains provision for the accumulation and disposal of grease without shutting down the cooker. The invention also provides for a continuous process cooker in which the fire hazards is reduced to a minimum.

These and other objects will become apparent from the following description and the accompanying drawing, in which:

FIGURE 3 is a central cross sectional view.

FIGURE 4 is a cutaway isometric view of the stripped down body of the cooker.

FIGURE 6 is an enlarged isometric detail of part of the conveyor chain drive.

Figure 1:
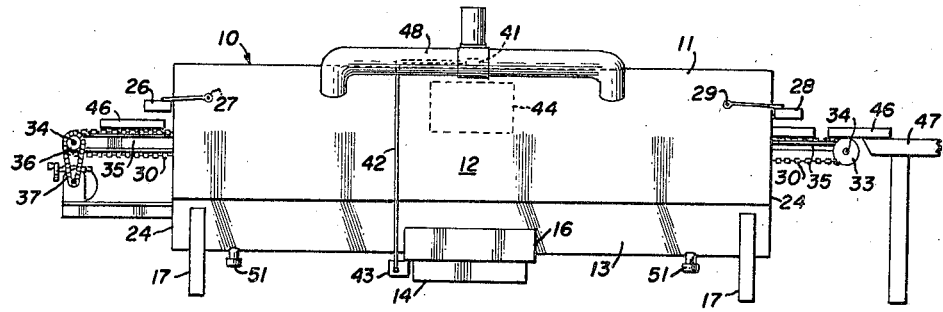
FIGURE 1 is side elevational view of a preferred form of the invention.
Figure 2:
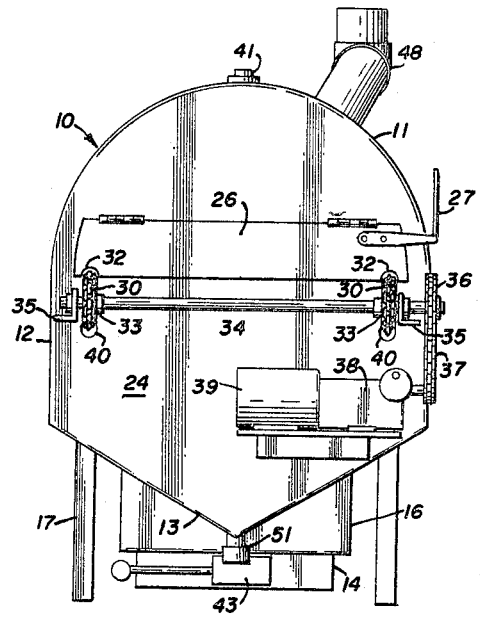
FIGURE 2 is an end elevational view on a larger scale of the cooker illustrated in FIGURE 1.
Figure 5:
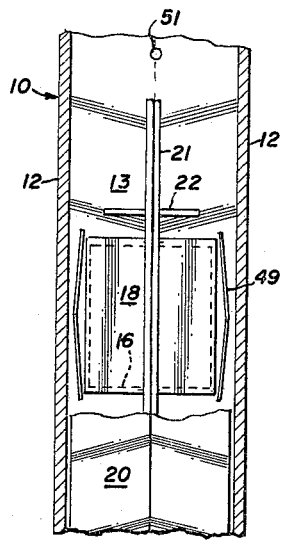
FIGURE 5 is a sectional plan view of the lower central portion of the cooker.

The form of the cooker illustrated consists of an insulated oven 10 with a semicylindrical top 11, vertical sides 12 and a V-shaped bottom 13 which serves as a trough for accumulated grease as explained hereinafter. A standard gas heater 14, approximately square, and having a burner 15 covering its entire surface is suspended in a well 16 inserted centrally in the bottom 13.

The entire structure is supported on legs 17. A heavy flat steel baffle plate 18 is supported just above the burner 15 with a small space for circulation between its edges 19 and the bottom 13. An additional baffle 20 forming an inverted V runs the entire length of the oven 10 and is supported on a central beam 21 reinforced by struts 22 and also on lugs 23 at its outer edges to hold it off the bottom 13 to allow circulation. The inverted V baffle 20 also stands away from the end walls 24 of the oven 10 a small distance. The baffle 20 is made in sections for convenience and on at least the center section over the burner 15 handles 25 are provided for easy removal. On removal of the center section of the baffle 20 the flat 18 can be lifted out for access to the burner 15 for cleaning or repair. Also by raising the baffle 20 hickory chips or other material can be placed on the flat baffle 18 to create smoke for imparting a barbecue flavor to the food.

A hinged entrance door 26 with a handle 27 is provided at the front end of the oven 10 and a similar exit door 28 with a handle 29 is provided at the rear of the oven. Conveyor chains 30 are supported by grooved runners 31 and enter and leave the oven 10 through notches 32 in the doors 26 and 28. The chains 30 are trained over pulleys 33 carried on shafts 34 journaled to frames 35 welded to the end walls 24 of the oven 10. A sprocket 36 fixed to one end of one shaft 34 is driven by a chain 37 powered by a variable speed transmission 38 and a motor 39. The return runs of the chains 30 are led through pipes 40 which prevent sagging and reduce the load on the pulleys 33 in the case of long ovens. A thermostat 41 in the top of the oven 10 is connected by a line 42 to the burner control 43. At least one side opening 44 with an insulated door 45 is located above the conveyor in the oven 10 so that a food tray 46 can be introduced at an intermediate point of the conveyor run so that the food on that particular tray will receive only part of the cooking time reecived by food introduced on trays thruogh the front door 26. In long ovens as many as three or four such openings (not shown) might be used. A receiving table 47 is located level with the conveyor at the exit end of the oven.

It has been found that the described arrangement of heavy steel baffles combined with the cylindrical upper half of the oven tends to distribute the heat so uniformly that overhead burners are not necessary for even and thorough cooking of the food. It has also been found that the food can be cooked at a lower temperature by eliminating hot and cold areas in the oven. Where individual orders are being cooked, as in a restaurant or catering services, a ticket identifying each order may be attached to the tray and sent through the oven with it. Where large quantities of meat are cooked, grease will accumulate inside the oven. A vent pipe 48 will carry some of the fumes to the outside air, but still a considerable amount condenses on the surfaces of the baffles and the inner walls of the oven. A gutter 49 is provided to keep the grease from draining into the burner 15 at the sides of the well 16, and dams 50 at each end of the burner 15 stop the grease which finally collects in the trough of the V-shaped bottom 13. Capped drain pipes 51 may be opened at any time to draw off the accumulation of grease without shutting down the cooker. The fact that the heat within the oven is thermostatically controlled and evenly distributed, preventing "hot spots" and that the accumulated grease cannot come in contact with the burner, substantially reduces the fire hazard of the cooker.

What is claimed is:

1. A continuous process conveyor cooker comprising an elongate oven having a raised top, vertical sides and a V-shaped bottom, closed ends with entry and exit doors, conveyor chains running longitudinally through said oven, at least one door on one side of said oven giving access to the space above said chains, heating means centrally located within a well in the bottom of said oven, a heavy flat baffle plate directly above said heating means, an inverted V-shaped baffle plate running longitudinally within said oven and above said flat baffle plate and with a space separating its edges from the sides, end walls and bottom of said oven, a thermostat in the top of said oven controlling said heating means, and a variable speed drive connected to said conveyor chains.

2. A cooker as described in claim 1 and having a smoke vest pipe leading from the top of said oven, gutters and dams placed to prevent drainage into said well containing said heating means, and a drain pipe leading from each segregated low area of said Y-shaped bottom.

3. A cooker as described in claim 1 having notches in said entry and exit doors to allow the passage of said conveyor chains with said doors in closed position, and having pipes enclosing the return run of said conveyor chains through said oven.

4. A cooker as described in claim 1 in which the portion of the inverted baffle directly over the said flat baffle is separate and removable by hand for access to said flat baffle.

References Cited

UNITED STATES PATENTS

| | | |
|---|---|---|
| 1,478,363 | 12/1923 | Schaller. |
| 1,524,541 | 1/1925 | DeKeir. |
| 1,657,580 | 1/1928 | Miller _____ 263—8 |
| 2,657,031 | 10/1953 | Tomlinson et al. _____ 263—8 |
| 3,301,170 | 1/1967 | Beasley _____ 99—331 |

WALTER A. SCHEEL, Primary Examiner

ARTHUR O. HENDERSON, Assistant Examiner

U.S. Cl. X.R.

99—261, 363, 443, 446, 447